Aug. 21, 1945.  F. R. McFARLAND  2,383,400
VIBRATION DAMPER
Filed Sept. 5, 1942
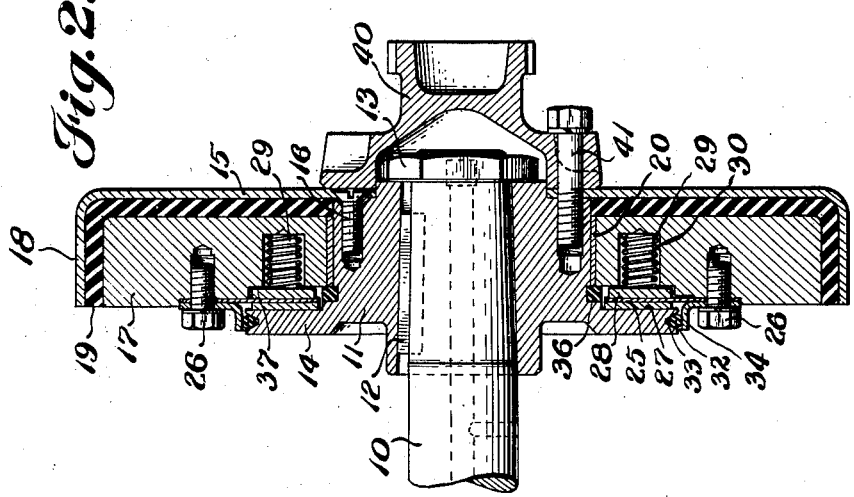
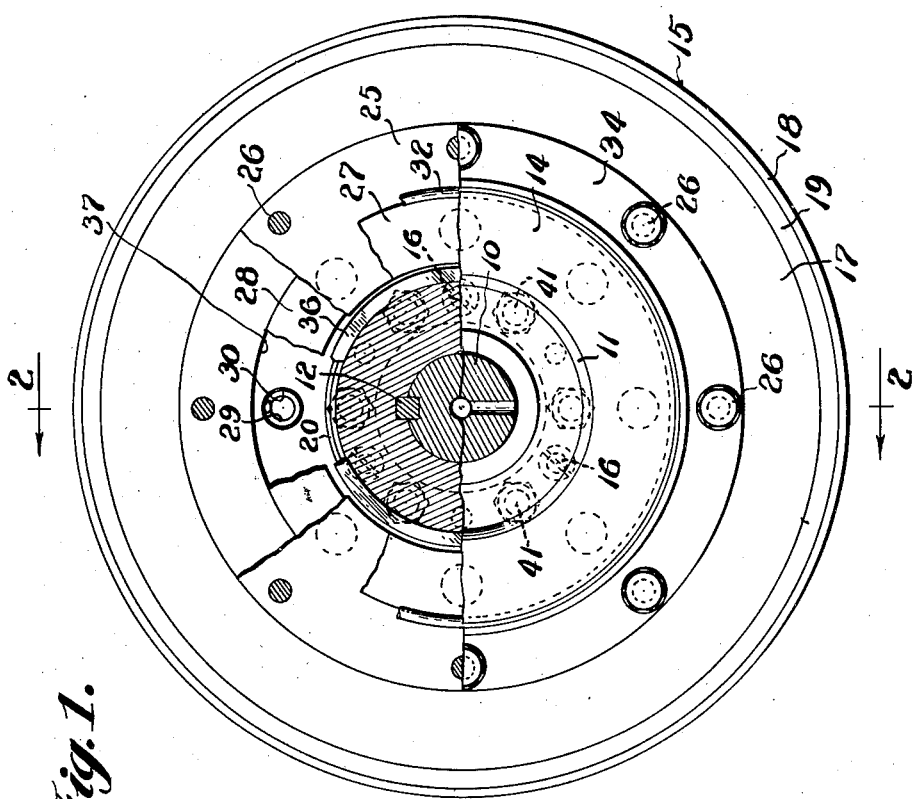
INVENTOR.
Forest R. McFarland
BY
Tibbitts & Hart
Attorneys Patented Aug. 21, 1945

2,383,400

UNITED STATES PATENT OFFICE 2,383,400

VIBRATION DAMPER

Forest R. McFarland, Huntington Woods, Mich., assignor to Packard Motor Car Company, Detroit, Mich., a corporation of Michigan Application September 5, 1942, Serial No. 457,408

1 Claim. (Cl. 74—574)

This invention relates to vibration dampers for shafts such as are used on internal combustion engines and more particularly on the crankshafts of such engines. It is of the type in which an inertia member is so connected with the shaft that it may move relatively thereto and, by reason of such connection, it will absorb energy and tend to damp torsional vibrations of the shaft.

One of the objects of the invention is to provide a damper of this character which is simple and inexpensive to construct and which may be readily assembled and disassembled.

Another object of the invention is to separate the rubber damping means and the surface friction damping means of a damper of the character above referred to so that in the construction of the damper the bonding of the rubber to the connected parts will not tend to destroy any of the friction properties of the surface friction means.

Another object of the invention is to provide a damper having both rubber and surface friction elements in which the rubber will act not only to absorb a portion of the energy but will act also as a pressure means, or as a part of the pressure means, of the friction element of the damper.

Other objects of the invention will appear from the following description taken in connection with the drawing, which forms a part of this specification, and in which:

Fig. 1 is a face view of a damper incorporating the invention, portions being broken away to show the various elements; and Fig. 2 is a sectional view of the damper taken on line 2—2 of Fig. 1.

Referring to the drawing, a shaft such as an engine crankshaft is indicated at 10 and mounted thereon is a hub member 11 keyed thereto by a key 12 and secured thereon as by a nut 13.

The hub member 11 is formed with two separated disk portions 14 and 15, the disk portion 15 being shown as detachable from the hub member, the several screws 16 securing the disk 15 to the hub member and being removable to detach the disk 15 therefrom.

In the assembled form of the damper shown in Fig. 2 an inertia member 17 shown in the form of a ring or flywheel is arranged between the disk members 14 and 15 of the hub member and the periphery of the disk member 15 is bent over to enclose the inertia member 17 thus forming an annular flange 18 somewhat separated from the periphery of the inertia member 17. As shown the ring or inertia member 17 is mounted for rotative movement on the hub member 11 with a bushing 20 between the two members for the purpose of centering the one on the other.

Preferably before the disk member 15 is assembled on the hub member and preferably before any of the other parts are assembled on the inertia member, the disk member 15 and inertia member 17 are connected together by a rubber means 19, the rubber being bonded to the adjacent surfaces of both members. This rubber means so interconnects the members 15 and 17 that they may be moved relatively only by distorting the rubber means. Thus upon torsional vibration of the crankshaft there will be slight relative movement between the inertia member and the shaft which will result in the deformation of the rubber means 19 and the consequent production of heat therein from internal friction, and thus the energy of vibration of the crankshaft will be absorbed and dissipated.

The damper also includes additional energy absorbing means in the form of surface friction means between the inertia member 17 and the disk portion 14 of the hub. This is for the purpose of taking care of certain vibration frequencies of the crankshaft in which the rubber means is not sufficient to dissipate the energy of vibration.

In the form of the invention shown there is a thin flexible disk 25 secured to the side of the inertia member 17 opposite the rubber connection of the inertia member with the disk member 15, this being secured to the inertia member by the bolts 26. Between the disk 25 and the disk member 14 of the hub 11 is a friction ring 27, which may be formed of cork, asbestos, or similar material, and between the disk 25 and the adjacent surface of the inertia member 17 is a backing ring 28. Seated in recesses 30 in the inertia member are coiled springs 29 which engage against the backing ring 28 and thereby exert pressure on the disk 25 and the friction ring 27 so that the latter presses frictionally against the inner surface of the disk member 14. Thus when there is relative rotative movement of the inertia member and the shaft the friction ring 27 will absorb inertia and thereby assist in the damping operation.

For the purpose of protecting the friction means from dirt, moisture, oil, etc., two sealing rings are provided, first, the sealing ring 32 arranged in a V groove 33 formed on the periphery of the disk member 14 of the hub. Surrounding and holding in place this sealing ring 32 is a metal ring 34 secured to the adjacent face of the inertia member 17. It may be secured as shown by the same bolts 26 that secure the disk 25 to the inertia member.

The other sealing ring is shown at 36 arranged in a slight groove in the hub member at one end of the bushing 20, thus at the same time protecting the bushing and the friction means.

In the construction shown the inertia member 17 is cut away to form a recess as at 37 for the purpose of receiving the backing ring 28 above referred to.

At the end of the shaft a gear 40 is shown secured in place on the hub by the bolts 41, thus adding an additional securing means for the detachable disk member.

It will be noted that with the above described construction the inertia member 17 and the disk member 15 may first be joined by the bonded rubber construction and then the friction means may be connected to the inertia member, all of this assembling being done before the parts are placed on the shaft. Then with the two sealing rings 32 and 36 in place the assembled inertia member and disk 15 may be placed on the hub and secured thereon by the screws 16. The thickness of the rubber means and the strength of the springs 29 will determine the pressure of the friction means against the disk 14, the rubber performing the dual function of pressing the friction parts together and of forming one of the damping elements of the device.

Although the invention has been described in connection with a specific embodiment, the principles involved are susceptible of numerous other applications which will readily occur to persons skilled in the art. The invention is therefore to be limited only as indicated by the scope of the appended claim.

What is claimed is:

A vibration damper for a crankshaft comprising a carrier hub having a radially directed disk, a member fixed to the hub in spaced relation to the disk, an inertia ring intermediate the disk and the member, rubber means between and bonded to the member and the inertia ring, a friction ring between the disk and the inertia ring, a friction disk fixed to the inertia ring and bearing against the friction ring, a backing ring engaging the friction disk on the face opposite the friction ring engaging portion, and spring means seated in the inertia ring and acting against said backing ring and friction disk to hold the friction ring engaged with the friction disk.

FOREST R. McFARLAND.